United States Patent
Robinson et al.

(10) Patent No.: US 10,292,036 B1
(45) Date of Patent: May 14, 2019

(54) SYSTEM, DEVICE, AND METHOD FOR MANAGING EMERGENCY MESSAGING

(71) Applicant: MOTOROLA SOLUTIONS, INC., Chicago, IL (US)

(72) Inventors: Chase Christian Robinson, Centerville, UT (US); Brady Moslander Walton, Centerville, UT (US); Christopher T Hellewell, Farmington, UT (US); Nicholas Orion Bishop, Herriman, UT (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/048,314

(22) Filed: Jul. 29, 2018

(51) Int. Cl.
| | |
|---|---|
| *H04M 11/04* | (2006.01) |
| *H04W 4/90* | (2018.01) |
| *H04W 4/12* | (2009.01) |
| *H04W 4/021* | (2018.01) |
| *G06Q 50/26* | (2012.01) |

(52) U.S. Cl.
CPC .............. *H04W 4/90* (2018.02); *G06Q 50/26* (2013.01); *H04W 4/021* (2013.01); *H04W 4/12* (2013.01)

(58) Field of Classification Search
CPC ....... H04W 4/02; H04W 4/024; H04W 4/029; H04W 4/90; H04W 76/50
See application file for complete search history.

(56) References Cited

U.S. PATENT DOCUMENTS

| | | | |
|---|---|---|---|
| 9,607,503 B1 | 3/2017 | Raj et al. | |
| 2010/0332131 A1* | 12/2010 | Horvitz | G01C 21/3484 701/414 |
| 2015/0186497 A1* | 7/2015 | Patton | H04W 4/21 707/740 |
| 2018/0189913 A1* | 7/2018 | Knopp | H04W 4/90 |

OTHER PUBLICATIONS

Wikipedia, "Reverse 9-1-1," website article (last edited on Mar. 22, 2018) 3 pages, https://en.wikipedia.org/wiki/Reverse_9-1-1.

* cited by examiner

*Primary Examiner* — Shantell L Heiber
(74) *Attorney, Agent, or Firm* — Michael Best & Friedrich LLP (57) ABSTRACT

Determining whether to transmit a reverse emergency message. An electronic computing device includes a network interface configured to receive one or more data feeds from one or more first network-connectable devices. The electronic computing device includes an electronic processor configured to determine that each data feed of the one or more data feeds is related to an incident based on content included in each data feed, a location from which each data feed was received, and a time associated with each data feed. The electronic processor is configured to determine a confidence value for the incident based on an incident type of the incident, a location type of the incident, and at least a portion of the data feeds. The electronic processor is configured to determine that the confidence value is above a predetermined threshold and transmit a reverse emergency message.

16 Claims, 4 Drawing Sheets

SYSTEM, DEVICE, AND METHOD FOR MANAGING EMERGENCY MESSAGING

BACKGROUND OF THE INVENTION

Reverse emergency communication such as reverse 911 communication may be used by organizations such as public safety organizations to deliver emergency notifications to groups of people (for example, missing child alerts such as AMBER alerts, notifications regarding dangerous weather or natural disasters, and the like).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As mentioned above, reverse emergency communication such as reverse 911 communication may be used by organizations such as public safety organizations to deliver emergency notifications to groups of people (for example, missing child alerts such as AMBER alerts, notifications regarding dangerous weather or natural disasters, and the like). For example, a public safety organization transmits a reverse emergency message to one or more network-connectable devices located within a geographic area impacted by the emergency. As another example, a public safety organization transmits a reverse emergency message to one or more network-connectable devices that have subscribed to receive certain types of reverse emergency messages and/or reverse emergency messages related to a certain geographical area. However, initiating a reverse emergency message may be cumbersome for a public safety organization. For example, a dispatcher of the public safety organization may have to obtain the permission of multiple supervisors before the dispatcher is able to transmit a reverse emergency message. In such situations, obtaining permission from multiple supervisors delays the transmitting of the reverse emergency message and may accordingly reduce the effectiveness of the reverse emergency message. Additionally, in other situations, a reverse emergency message may be transmitted in error and may cause unnecessary concern by recipients of the erroneous reverse emergency message. False concerns raised erroneous reverse emergency messages may result in further incidents that could have been avoided by preventing the transmission of the false reverse emergency message. Thus, there is a technological problem with respect to determining whether to transmit a reverse emergency message.

Disclosed are, among other things, a method, device, and system for one or more electronic processors to manage emergency messaging. In some embodiments, the one or more electronic processors determine whether to transmit a reverse emergency message based on a confidence value for an incident that is based on an incident type of the incident, a location type of the incident, and at least a portion of data feeds received from one or more network-connectable devices. The disclosed method, device, and system solve the above-noted technological problem by using a set of rules to determine whether to transmit a reverse emergency message in a systematic and efficient manner. For example, by automating analysis of received data feeds using the set of rules, the disclosed method, device, and system systematically determine whether to initiate a reverse emergency message for a given incident such as a public safety incident. Additionally, the disclosed method, device, and system may reduce or eliminate errors in judgment made by dispatchers during manual determination of whether to transmit a reverse emergency message.

One or more devices such as tablets, laptops, desktop computers, telephones (for example, cellular, landline, or satellite), devices with an interactive display, and other communication devices may be a part of a dispatch console operated by a dispatcher such as a public safety dispatcher. In some situations, a command center such as a public safety command center includes one or more dispatch consoles each operated by a different dispatcher. In some embodiments, the dispatch consoles receive one or more data feeds (for example, a voice call, a live or recorded video feed, a text message, and the like) related to an incident from a citizen, and the dispatcher decides how to respond to the data feed to help the citizen and handle the incident. For example, the dispatcher may transfer the data feed to a different agency (for example, animal control), take no action (for example, when the data feed is a prank call or an accidental call), dispatch officers to the location of the incident, and the like.

In some embodiments, a data feed relates to an incident in which officers are supervising, maintaining, providing assistance, and the like (for example, a concert, a sporting event, management of a theme park or other entertainment venue, and the like). In some embodiments, the incident is an event, occurrence, or situation in which officers are involved. In some embodiments, the incident is a public safety incident in which public safety officers are called to a location to provide assistance in resolving or preventing a societal or environmental problem (for example, a location where a suspect is committing or has committed a crime, a fire, a vehicular accident, a traffic stop, and the like).

In some embodiments, the dispatch console of the dispatcher additionally or alternatively receives one or more data feeds from devices of officers handling the incident. In some embodiments, officers are personnel acting on behalf of a dispatching, supervising, or responsible agency/entity (for example, employees of a theme park; security guards at a concert or sporting event; public safety officers such as police officers, firefighters, and paramedics; and the like). As an example of the dispatch console receiving data feeds from devices of officers, the dispatch console of the dispatcher receives a video feed or an image feed from one or more of a camera of a network-connectable device such as a smart telephone, a dash camera of a vehicle, and a body-worn camera of an officer. As another example, the dispatch console of the dispatcher receives a data feed from a biometric sensor that monitors biometric data of an officer. In some embodiments, the dispatch console receives data feeds from network-connectable devices that are not operated by a citizen or an officer. For example, the dispatch console receives a data feed from one or more of a security camera, a traffic camera, an alarm system that monitors a building (for example, a fire alarm, a toxic gas alarm, and the like), and the like.

One embodiment provides an electronic computing device including a network interface configured to receive one or more data feeds from one or more first network-connectable devices. The electronic computing device further includes an electronic processor configured to determine that each data feed of the one or more data feeds is related to an incident based on content included in each data feed, a location from which each data feed was received, and a time associated with each data feed. The electronic processor is further configured to determine a confidence value for the incident based on an incident type of the incident, a location type of the incident, and at least a portion of the data feeds. The electronic processor is further configured to determine that the confidence value is above a predetermined threshold. The electronic processor is further configured to transmit, via the network interface, a message including information about the incident to a second network-connectable device in response to determining that the confidence value of the incident is above the predetermined threshold.

Another embodiment provides a method of managing emergency messaging. The method includes receiving, via a network interface of an electronic computing device, one or more data feeds from one or more first network-connectable devices. The method further includes determining, with an electronic processor of the electronic computing device, that each data feed of the one or more data feeds is related to an incident based on content included in each data feed, a location from which each data feed was received, and a time associated with each data feed. The method further includes determining, with the electronic processor, a confidence value for the incident based on an incident type of the incident, a location type of the incident, and at least a portion of the data feeds. The method further includes determining, with the electronic processor, that the confidence value is above a predetermined threshold. The method further includes transmitting, via the network interface, a message including information about the incident to a second network-connectable device in response to determining that the confidence value of the incident is above the predetermined threshold.

Figure 1:
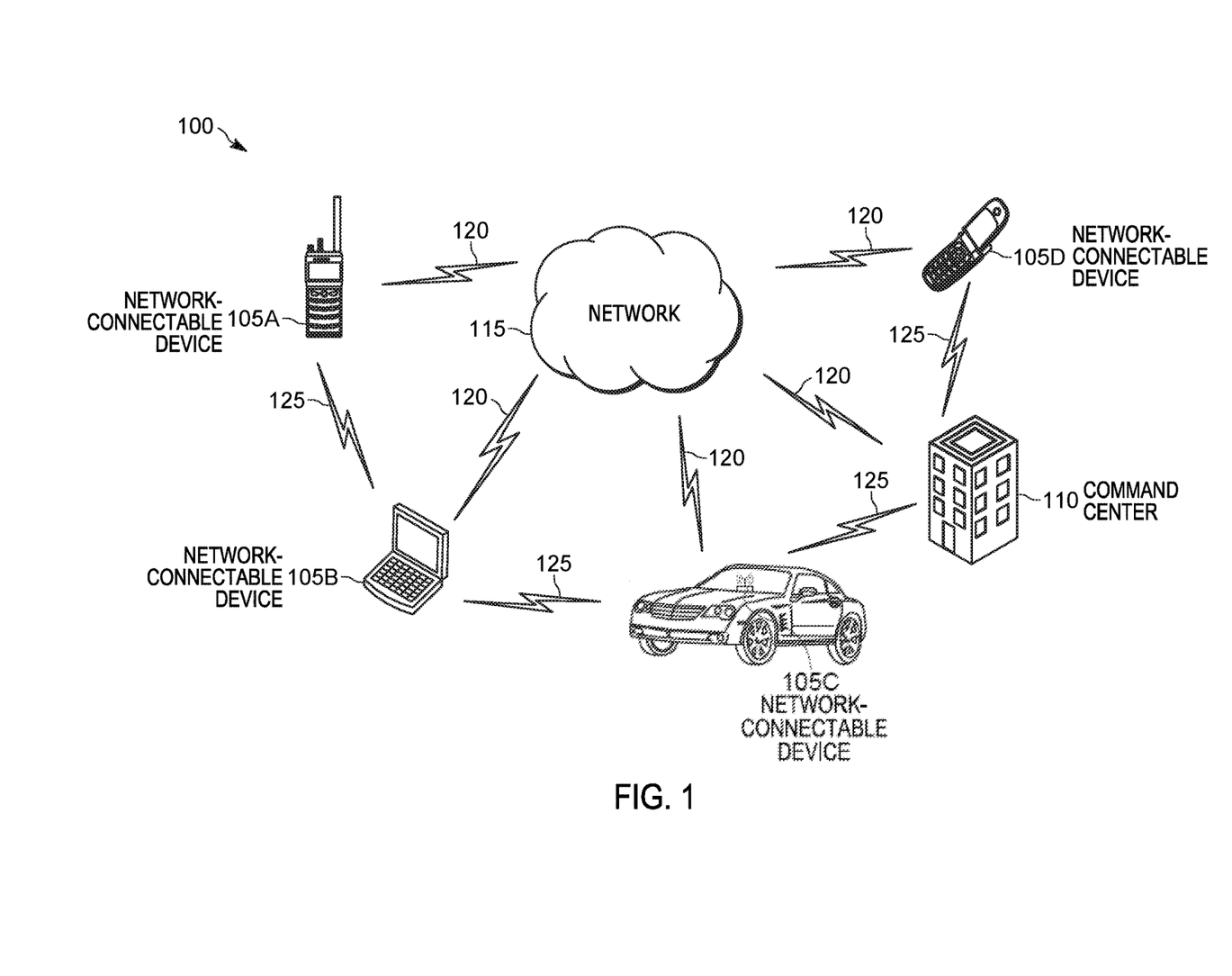
FIG. 1 is a block diagram of a communication system according to one example embodiment.

FIG. 1 is a block diagram of a communication system 100 according to one example embodiment. The communication system 100 includes various network-connectable devices 105A through 105D. In the following description, when explaining how a single network-connectable device functions, a reference to network-connectable device 105 is used. As indicated by FIG. 1, the network-connectable device 105 may be any one of a number of different types of network-connectable devices. For example, network-connectable device 105A is a portable communication device carried by an officer during patrol (for example, an employee of a theme park; a security guard at a concert or sporting event; a public safety officer such as police officer, firefighter, and paramedic; and the like). In some embodiments, network-connectable device 105A is a smart phone, a battery powered portable radio, a body wearable camera, a biometric sensor, or similar device. As another example, network-connectable device 105B is a laptop computer that can receive input from a user via a keyboard or touchscreen display or via a microphone (for example, voice commands). In other embodiments, network-connectable device 105B is a tablet, a desktop computer, or a similar device. As another example, network-connectable device 105C is a vehicular mobile communication device (for example, a police vehicle, a fire truck, an ambulance, a maintenance vehicle such as a tow truck, and the like). Network-connectable device 105C may include, but is not limited to, a dashboard camera, a microphone, a laptop, and the like. As yet another example, network-connectable device 105D is a smart phone operated by a civilian. Network-connectable device 105D may be any type of network-connectable device (for example, a laptop, desktop computer, tablet, smart watch, and the like).

The types of network-connectable devices 105A through 105D described above and shown in FIG. 1 are merely examples. In other embodiments, the communication system 100 includes other types of network-connectable devices. For example, an alarm system or other sensor or sensing system such as a fire alarm system, a toxic gas alarm system, or the like is a network-connectable device 105. In some embodiments, the communication system 100 includes more or fewer network-connectable devices 105 than the number of network-connectable devices 105 shown in FIG. 1.

As shown in FIG. 1, the communication system 100 also includes a command center 110. For example, the command center 110 is a security management office at a theme park or a public safety command center such as a police headquarters, fire station, dispatch center, public safety answering point (PSAP), operations center, command and control facility, and the like. In some embodiments, the command center 110 includes one or more network-connectable devices 105 that are part of the communication system 100 as explained below with respect to FIG. 2. In the following description, when explaining communication to or from the command center 110, it should be understood that such communication is occurring to or from one or more of the network-connectable devices 105 included in the command center 110.

As indicated in FIG. 1, the network-connectable devices 105A through 105D and the command center 110 may communicate with each other over a network 115 over respective wireless links 120 and via corresponding network interfaces including one or more transceiver circuits (for example, by sending and receiving radio signals). The network 115 may include wireless and wired portions. All or parts of the network 115 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks. In some embodiments, the network 115 may also include a combination of the networks mentioned.

Also as shown in FIG. 1, in some embodiments, the network-connectable devices 105A through 105D and the command center 110 may communicate directly with each other via direct-mode wireless link(s) 125 using a communication channel or connection that is outside of the network 115. For example, the network-connectable devices 105A through 105D and the command center 110 communicate directly with each other when they are within a predetermined distance from each other. Although FIG. 1 only shows direct-mode wireless links 125 between adjacent network-connectable devices 105, in some embodiments, any one of the network-connectable devices 105 and the command center 110 is capable of communicating with another network-connectable device 105 or the command center 110 via a direct-mode wireless link 125.

Figure 2:
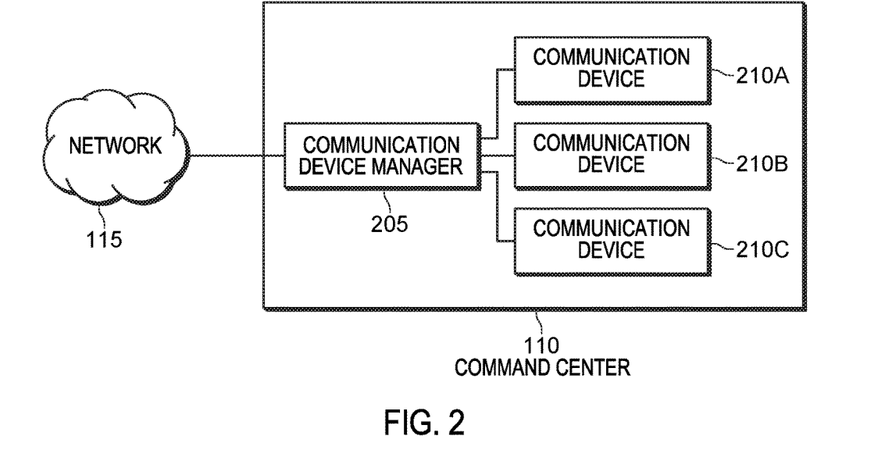
FIG. 2 is a block diagram of a command center included in the communication system of FIG. 1 according to one example embodiment.

FIG. 2 is a block diagram of the command center 110 according to one example embodiment. In some embodiments, the command center 110 includes a communication device manager 205 and a plurality of communication devices 210A through 210C that are similar to and may be considered network-connectable devices 105 as explained above. In the following description, when explaining how a single communication device functions, a reference to communication device 210 is used. In some embodiments, the communication devices 210 are dispatch consoles that are each operated by a separate dispatcher (for example, public safety dispatch consoles each operated by a separate public safety dispatcher as explained above). In some embodiments, the communication device manager 205 is communicatively coupled to the network 115 and to the communication devices 210A through 210C via wired connections, wireless connections, or a combination thereof. As explained in greater detail below, the communication device manager 205 is configured to receive one or more data feeds from a one or more of network-connectable devices 105 over the network 115. In some embodiments, the communication device manager 205 is configured to control which received data feeds are provided to which communication devices 210. In some embodiments, the communication devices 210 are configured to communicate through the communication device manager 205 to one or more network-connectable devices 105 over the network 115.

While FIG. 2 shows the communication devices 210 and the communication device manager 205 as separate devices, in some embodiments, the communication devices 210 are integrated into the communication device manager 205 and directly controlled by the communication device manager 205. In other embodiments, the command center 110 may not include a separate communication device manager 205 and the functionality of the communication device manager 205 described below may be integrated into each of the communication devices 210. In some embodiments, the command center 110 includes more or fewer communication devices 210 than the number of communication devices 210 shown in FIG. 2.

Figure 3:
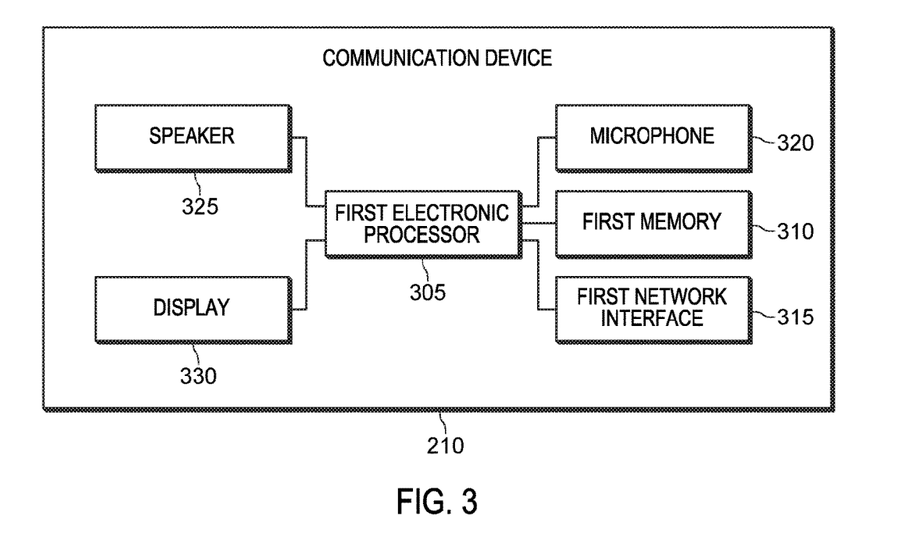
FIG. 3 is a block diagram of a communication device included in the command center of FIG. 2 according to one example embodiment.

FIG. 3 is a block diagram of a communication device 210 according to one example embodiment. In the embodiment illustrated, the communication device 210 includes a first electronic processor 305 (for example, a microprocessor or other electronic device). The first electronic processor 305 includes input and output interfaces (not shown) and is electrically coupled to a first memory 310, a first network interface 315, a microphone 320, a speaker 325, and a display 330. In some embodiments, the communication device 210 includes fewer or additional components in configurations different from that illustrated in FIG. 3. For example, the communication device 210 may additionally include a push-to-talk button or a camera. As another example, the communication device 210 may include one or more additional input devices such as a computer mouse and/or a keyboard that receive inputs from a user of the communication device 210. As yet another example, the communication device 210 may be an information-receiving device that receives and displays information without including data transmission capabilities. In some embodiments, the communication device 210 performs functionality other than the functionality described below.

The first memory 310 may include read only memory (ROM), random access memory (RAM), other non-transitory computer-readable media, or a combination thereof. The first electronic processor 305 is configured to receive instructions and data from the first memory 310 and execute, among other things, the instructions. In particular, the first electronic processor 305 executes instructions stored in the first memory 310 to perform the methods described herein.

The first network interface 315 sends and receives data to and from the communication device manager 205. In some embodiments, the first network interface 315 additionally or alternatively sends and receives data to and from the network 115 without the data first passing through a separate communication device manager 205. In some embodiments, the first network interface 315 includes one or more transceivers for wirelessly communicating with the communication device manager 205 and/or the network 115. Alternatively or in addition, the first network interface 315 may include a connector or port for receiving a wired connection to the communication device manager 205 and/or the network 115, such as an Ethernet cable. The first electronic processor 305 may receive one or more data feeds (for example, a video feed, an audio feed, an image feed, a text feed, a sensor input data feed, and the like) over the network 115 through the first network interface 315 (for example, data feeds generated by one or more network-connectable devices 105 and transmitted over the network 115). In some embodiments, the first electronic processor 305 receives data feeds through the first network interface 315 directly from a network-connectable device 105. In some embodiments, communication of data feeds may occur in approximately real-time. The first electronic processor 305 may communicate data generated by the communication device 210 over the network 115 through the first network interface 315, such as for receipt by one or more network-connectable devices 105. For example, the first electronic processor 305 receives electrical signals representing sound from the microphone 320 and may communicate information relating to the electrical signals over the network 115 through the first network interface 315 to other devices, for example, to one or more network-connectable devices 105. Similarly, the first electronic processor 305 may output the one or more data feeds received from the network 115 through the first network interface 315, for example, from a network-connectable device 105, through the speaker 325, the display 330, or a combination thereof.

The display 330 displays images, video, text, and/or data from sensor inputs to the user (for example, a dispatcher). The display 330 may be a liquid crystal display (LCD)

screen or an organic light emitting display (OLED) display screen. In some embodiments, a touch sensitive input interface may be incorporated into the display 330 as well, allowing the user to interact with content provided on the display 330. In some embodiments, the display 330 includes a projector or future-developed display technologies. In some embodiments, the speaker 325 and the display 330 are referred to as output devices that present data feeds to a user of the communication device 210 (for example, a dispatcher). In some embodiments, the microphone 320, a computer mouse, and/or a keyboard or a touch-sensitive display are referred to as input devices that receive input from a user of the communication device 210.

In some embodiments, the network-connectable devices 105 include similar components as those shown in FIG. 3 with respect to the communication device 210. In some embodiments, the network-connectable devices 105 include fewer or additional components in configurations different from that illustrated in FIG. 3. For example, a network-connectable device 105 may also include one or more of a push-to-talk button to initiate voice communication over the network 115 (in other words, an audio feed), a camera to capture a video feed and/or an image feed to be transmitted over the network 115, and a location component (for example, a global positioning system receiver) configured to determine the geographic coordinates of the location of the network-connectable device 105. In some embodiments, the network-connectable devices 105 transmit their respective location coordinates over the network 115 when transmitting data feeds to the command center 110 (for example, location information is stored as metadata associated with a data feed). Similarly, in some embodiments, the network-connectable devices 105 also include a time stamp when transmitting a data feed such that the command center 110 may determine a time associated with the data feed (for example, a time of capture of the data feed, a time of transmission of the data feed, and the like). In some embodiments, the network-connectable devices 105 transmit a text feed over the network 115 to the command center 110 (for example, a text message from a smart phone, portable radio, or the like).

In some embodiments, a network-connectable device 105 also includes one or more sensors to generate data related to a user of the network-connectable device 105 and/or an environment of the network-connectable device 105. For example, the network-connectable device 105 may include a biometric sensor to monitor biometric data of a user (for example, a citizen, an officer such as a public safety officer, and the like) such as heart rate, breathing rate, body temperature, and the like. As another example, the network-connectable device 105 may include a pedometer, a sensor-enabled holster to detect when a weapon has been removed from the holster, and/or a sensor that detects when the weapon has been discharged. As yet another example, the network-connectable device 105 may include one or more sensors that monitor an environment of the user such as temperature, humidity, air quality, ambient noise level, and the like.

In some embodiments, one or more sensors may communicate over the network 115 and may, themselves, be considered network-connectable devices 105. In other embodiments, one or more sensors are separate from a network-connectable device 105, and the separate sensors are not capable of directly communicating over the network 115. In such embodiments, the separate sensors (for example, a sensor-enabled holster) may communicate over the network 115 via a network-connectable device 105 (for example, a nearby smart phone, portable radio, and the like). For example, such separate sensors form a personal area network (PAN) with the network-connectable device 105 via corresponding short-range PAN transceivers, which may be based on a Bluetooth, Zigbee, Bluetooth Low Energy, WiFi, Near Field Communication (NFC), Radio Frequency ID (RFID) or other short-range wireless protocol. In such embodiments, the combination of the network-connectable device 105 and associated separate sensors that communicate monitored data to the network-connectable device 105 may be referred to as a single network-connectable device 105. In some embodiments, the network-connectable devices 105 transmit one or more sensor input data feeds over the network 115 to the command center 110, for example, to be displayed on a communication device 210 of a dispatcher. In some embodiments, the network-connectable devices 105 perform functionality other than the functionality described above.

Figure 4:
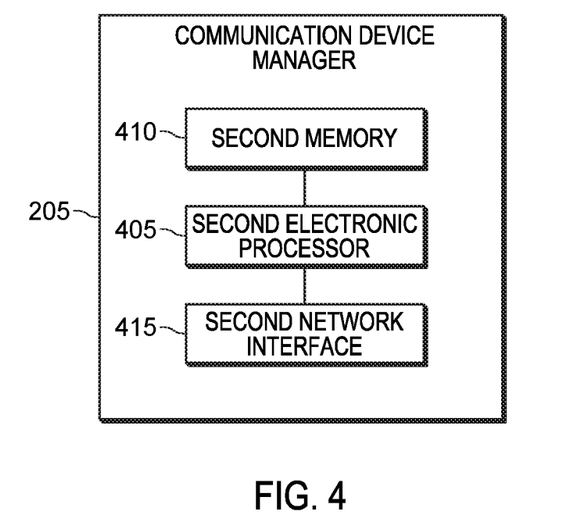
FIG. 4 is a block diagram of a communication device manager included in the command center of FIG. 2 according to one example embodiment.

FIG. 4 is a block diagram of the communication device manager 205 according to one example embodiment. In the example shown, the communication device manager 205 includes a second electronic processor 405 electrically connected to a second memory 410 and a second network interface 415. These components are similar to the like-named components of the communication device 210 explained above with respect to FIG. 3 and function in a similar manner as described above. In some embodiments, the second network interface 415 sends and receives data to and from the network 115 and the communication devices 210. As explained in greater detail below, in some embodiments, the second electronic processor 405 is configured to monitor and analyze received data feeds from the network-connectable devices 105 (for example, an audio feed of a voice call that is provided to one of the communication devices 210). In some embodiments, the communication device manager 205 includes fewer or additional components in configurations different from that illustrated in FIG. 4. For example, the communication device manager 205 may additionally include a display such as a touch screen to allow a user to reprogram settings or rules of the methods described below. In some embodiments, the communication device manager 205 performs functionality other than the functionality described below.

As explained above, in some embodiments, the communication devices 210 are dispatch consoles (for example, public safety dispatch consoles at a command center 110) that receive data feeds from network-connectable devices 105 operated by citizens. However, in some embodiments, the communication devices 210 additionally or alternatively receive data feeds from network-connectable devices 105 operated by officers such as public safety officers. The public safety officers may be trained to identify and handle many different public safety incidents. In some situations, the network-connectable device 105 of an officer may receive a user input from the officer indicating a type of incident (for example, by the officer entering a code that represents the incident type). The network-connectable device 105 of the officer may also receive user input from the officer indicating other information related to the incident (for example, location, number of victims, and the like). In some embodiments, the network-connectable device 105 of the officer then transmits this information as well as any selected data feeds (for example, a voice call, a stored or real-time video feed, a text message, and the like) over the network 115 to the communication device manager 205 or directly to one or more communication devices 210.

In some embodiments, data feeds are received from network-connectable devices 105 that include, for example, sensors and a camera, that are not operated by a citizen or an officer. For example, data feeds may be received from one or more of a security camera, a traffic camera, an alarm system that monitors a building (for example, a fire alarm, a toxic gas alarm, and the like), and the like.

While FIGS. 3 and 4 show separate block diagrams of the communication device 210 and the communication device manager 205, as noted above, in some embodiments, the communication devices 210 are integrated into the communication device manager 205 and directly controlled by one or more electronic processors of the communication device manager 205. In other embodiments, the functionality of the communication device manager 205 may be integrated into each of the communication devices 210. In some embodiments, the communication device manager 205, the communication devices 210, and/or a combination thereof are referred to an electronic computing device that performs the functionality described below. For example, the electronic computing device may be a single electronic processor (for example, the second electronic processor 405 of the communication device manager 205) or a plurality of electronic processors located in the communication device manager 205. In other embodiments, the electronic computing device includes multiple electronic processors distributed across different devices. For example, the electronic computing device is implemented on one or more of the first electronic processors 305 of the communication devices 210, the second electronic processor 405 of the communication device manager 205, and one or more electronic processors located in one or more other devices located at the command center 110, at a remote location, or at a remote cloud-computing cluster.

As explained above, reverse emergency communication may be used by organizations such as public safety organizations (for example, at a command center 110) to deliver emergency notifications to groups of people (for example, missing child alerts, notifications regarding dangerous weather or natural disasters, and the like). However, initiating a reverse emergency message may be cumbersome for an organization. For example, a dispatcher of the public safety organization may have to obtain the permission of multiple supervisors before the dispatcher is able to transmit a reverse emergency message. In such situations, obtaining permission from multiple supervisors delays the transmitting of the reverse emergency message and may accordingly reduce the effectiveness of the reverse emergency message. Additionally, in other situations, a reverse emergency message may be transmitted in error and may cause unnecessary concern by recipients of the erroneous reverse emergency message. False concerns raised erroneous reverse emergency messages may result in further incidents that could have been avoided by preventing the transmission of the false reverse emergency message. Thus, there is a technological problem with respect to determining whether to transmit a reverse emergency message.

Figure 5:
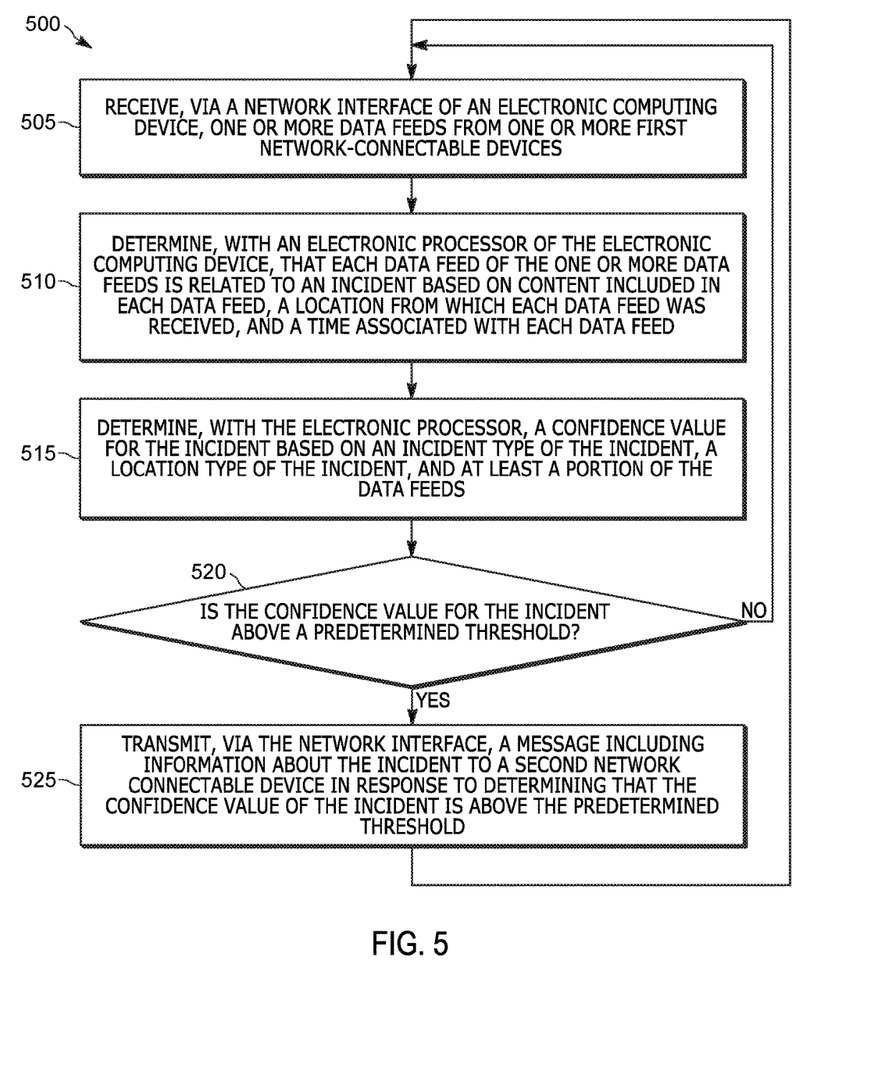
FIG. 5 is a flow chart of a method for determining whether to transmit a reverse emergency message according to one example embodiment.

To solve this technological problem, the electronic computing device described above performs, in one instance, one or more of the methods explained below. For example, a method 500 of FIG. 5 is executed by the electronic computing device to determine whether to transmit a reverse emergency message based on a confidence value for an incident that is based on an incident type of the incident, a location type of the incident, and at least a portion of data feeds received from one or more network-connectable devices 105. The method 500 solves the above-noted technological problem by using a set of rules to determine whether to transmit a reverse emergency message in a systematic and efficient manner. For example, by automating analysis of received data feeds using the set of rules, the disclosed method, device, and system systematically determine whether to initiate transmission of a reverse emergency message for a given incident such as a public safety incident. Additionally, the disclosed method, device, and system may reduce or eliminate errors in judgment made by dispatchers during manual determination of whether to transmit a reverse emergency message.

FIG. 5 illustrates a flow chart of the method 500 performed by the electronic computing device for determining whether to transmit a reverse emergency message. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure.

At block 505, the electronic computing device receives, via a network interface, one or more data feeds from one or more first network-connectable devices 105. For example, the network interface is the first network interface 315, the second network interface 415, or a combination thereof as described above. In some embodiments, each of the one or more data feeds includes at least one of the group consisting of a video feed, an audio feed, an image feed, a text feed, and a sensor input data feed. As explained above, the one or more data feeds may be received from network-connectable devices 105 operated by citizens (for example, a smart phone) or officers such as public safety officers (for example, a portable radio carried by an on-duty police officer, a dashboard camera of a police vehicle, a body-worn camera of a police officer, and the like). As another example, one or more data feeds may be received from an alarm notification system that monitors one or more of a building, a park, a fence, a parking lot, and other geographical locations (for example, a fire alarm, a toxic gas alarm, and the like).

At block 510, the electronic computing device determines that each data feed of the one or more data feeds is related to an incident based on content included in each data feed, a location from which each data feed was received, and a time associated with each data feed. In other words, the electronic computing device evaluates the content included in received data feeds, such as keywords extracted from the data feed itself as explained in greater detail below and metadata included in the data feed, and determines which data feeds relate to which incidents. As one example, an incident is an emergency situation involving an injury to a person, a natural disaster, or some other situation in which officers are supervising, maintaining, providing assistance, and the like such as a concert, a sporting event, management of a theme park or other entertainment venue, and the like. In some embodiments, the incident is a public safety incident in which public safety officers such as police officers, firefighters, paramedics, and/or the like are called to a location to provide assistance in resolving or preventing a societal or environmental problem (for example, a location where a suspect is committing or has committed a crime, a fire, a vehicular accident, a traffic stop, and the like).

With respect to data feeds received from network-connectable devices 105 of citizens and officers, the communication device manager 205 may determine that received data feeds are associated with the same incident based on content included in the data feeds. For example, the electronic computing device filters received data feeds into keywords that summarize the received data feeds and may indicate similarities between incidents. For example, the electronic computing device uses a natural language processing engine to recognize keywords spoken by a caller during a call (for example, "gas leak," "fire," and the like). For example, the electronic computing device uses a natural language processing engine to recognize a code spoken by the officer during a call that corresponds to, for example, a gas leak, a fire, or the like. Based on the known meaning of the code, the electronic computing device may associate one or more keywords with the data feed. In some embodiments, the code is included in metadata received along with the data feed after a network-connectable device 105 such as a laptop or portable radio receives an input from an officer entering the code via an input device. As another example of the electronic computing device determining that received data feeds are associated with the same incident, the electronic computing device uses text recognition techniques to recognize keywords included in a text message (for example, "gas leak," "fire," and the like). As yet another example, the electronic computing device uses image/video recognition techniques to categorize image feeds and/or video feeds by, for example, categorizing a received video of a fire with a keyword of "fire."

With respect to data feeds received from an alarm system (for example, a sensor input data feed), the electronic computing device may determine that the received data feeds are associated with the same incident based on the type of alarm system and the location of the alarm system. In some embodiments, such information is included in metadata received with the data feed. As an example, when two fire alarms in the same building provide a data feed to the electronic computing device, the electronic computing device determines that the incident is a fire in the building and that the data feeds are related to the same incident.

With respect to the electronic computing device using a location from where a data feed was received as a factor to determine that the data feed is related to an incident, as explained above, received data feeds may include metadata that provides location information of the network-connectable device 105. Such metadata may allow the electronic computing device to determine the location of the network-connectable device 105 when the data feed was transmitted by the network-connectable device 105 and/or received by the electronic computing device.

Similarly, the electronic computing device may use a time associated with a data feed to determine that the data feed is related to an incident. For example, as explained above, metadata of data feeds may include time stamp information that allows the electronic computing device to determine a time at which the data feed was transmitted or captured by the network-connectable device 105. In situations where time stamp information is not included in the data feed, the electronic computing device may use a time of receipt of the data feed at the electronic computing device as a factor in determining that the data feed is related to an incident. In other words, the time associated with a data feed may be a time of transmission of the data feed by the network-connectable device 105, a time of capture of the data feed by the network-connectable device 105, or a time of receipt of the data feed by the electronic computing device at the command center 110. In some embodiments, the electronic computing device uses a proximity in time between received data feeds as a factor when determining whether the data feeds relate to the same incident. As one example, data feeds received five minutes apart may relate to the same incident while data feeds received five hours apart may not relate to the same incident.

In some embodiments, the electronic computing device uses the three above-explained factors (content of a data feed such as extracted keywords, a location from which the data feed was received, and a time associated with the data feed) to determine that the data feed is related to an incident. For example, the electronic computing device may analyze an initially-received data feed and, based on these three factors, the electronic computing device determines that a gas leak is occurring at 123 Main Street at noon. When later-received data feeds include information that matches or nearly matches these three factors, the electronic computing device determines that the later-received data feeds relate to the same incident (in other words, the same gas leak). For example, the electronic computing device determines that a later-received data feed has extracted keywords that relate to a gas leak. The electronic computing device may also determine that the later-received data feed was transmitted from a location within a predetermined distance (for example, twenty meters) from the location from which the initially-received data feed was received. The electronic computing device may also determine that the later-received data feed was received within a predetermined time (for example, ten minutes) of when the initially-received data feed was received. In this example, the electronic computing device accordingly determines that the later-received data feed is related to the same incident as the initially-received data feed.

On the other hand, when at least one of the factors of later-received data feeds includes information that does not match the three factors of the initially-received data feed, the electronic computing device may determine that the later-received data feeds relate to a different incident. For example, when the extracted keywords of the later-received data feed is different than that of the initially-received data feed, the electronic computing device determines that the data feed relates to a different incident. As another example, when the location from which the data feed was received is more than a predetermined distance away from the location from which the initially-received data feed was received, the electronic computing device determines that the data feed relates to a different incident. As yet another example, when the times associated with two data feeds are greater than a predetermined time apart, the electronic computing device determines that the data feeds relate to separate incidents.

Although three factors are described above as being used by the electronic computing device to determine that a data feed is related to an incident, in some embodiments, the electronic computing device uses additional factors to determine that a data feed is related to an incident. In some embodiments, the electronic computing device stores at least one of the content included in each received data feed, the location from which each data feed was received, and the time associated with each data feed (for example, time of transmission, time of capture, or time of receipt). For example, the electronic computing device stores this information in at least one of the first memory 310 of a communication device 210, the second memory 410 of the communication device manager 205, and another memory of a device located at the command center 110, at a remote location, or at a remote cloud-computing cluster.

At block 515, the electronic computing device determines a confidence value for the incident based on an incident type of the incident, a location type of the incident, and at least a portion of the data feeds relating to the incident. In some embodiments, the electronic computing device determines an incident type of the incident by analyzing the content of one or more data feeds as explained above. For example, the electronic computing device uses one or more of a natural language processing engine, image/video recognition techniques, and text recognition techniques to determine keywords included in or that summarize the received data feeds (for example, a fire, a gas leak, a tornado, and the like). With respect to data feeds received from network-connectable devices 105 of officers, the electronic computing device may determine an incident type of the incident based on a predetermined code included in a data feeds that was received by a network-connectable device 105 of an officer via an input device.

In some embodiments, the electronic computing device determines a location type of the incident based on the location information determined about the data feed as described above with respect to the block 510. For example, the electronic computing device may request information from a database regarding location information indicating the location from which the data feed was received. For example, the electronic computing device receives geographic coordinates from a network-connectable device 105 and references a database to determine the location type corresponding to the location coordinates. In other words, the electronic computing device determines whether the geographic coordinates correspond to a school, a residential home, a business building, a government building, and the like. In some embodiments, the database is a local database at the command center 110 and may be integrated into the first memory 310 of a communication device 210 or second memory 410 of the communication device manager 205. In other embodiments, the database is a remote database located at another location or in a cloud-computing cluster that is accessible over the network 115. In some embodiments, the database is owned and/or maintained by a third party.

In some embodiments, the electronic computing device determines the confidence value for the incident based on at least a portion of the data feeds received that relate to the incident and based on the incident type and the location type of the incident. In some embodiments, the confidence value is a score that indicates when a reverse emergency message should be transmitted to one or more network-connectable devices 105 within a predetermined area located at or near the location of the incident. For example, the electronic computing device may determine an initial score of ten out of a maximum of one hundred when an initial data feed (for example, a call from citizen) is received regarding an incident such as a gas leak. For each subsequent data feed that the electronic computing device receives regarding the same incident, the electronic computing device may increase the confidence value of the incident. For example, the electronic computing device may increase the confidence value by ten points for each subsequent data feed received regarding the incident.

In some embodiments, the electronic computing device determines different initial confidence values and different increase amounts to confidence values for different data feeds depending on the reliability of the information included in the data feed. For example, the electronic computing device determines that image/video feeds increase the confidence value more than audio feeds because there may be a lower chance of prank image/video feeds than prank audio feeds. In other words, image/video feeds may be more reliable than audio feeds. Similarly, the electronic computing device may set a higher initial confidence value or increase the confidence value more based on data feeds received from officers than based on data feeds received from citizens (for example, because officers are trained to identify incidents and may be less likely to improperly report an incident). In some embodiments, the different initial confidence values and the different increase amounts to confidence values are referred to as weighting factors.

As one example of different weighting factors, each data feed related to the incident that is received after the initial data feed that is related to the incident may increase the confidence value by two points when received from a network-connectable device 105 of a citizen and five points when received from a network-connectable device 105 of an officer. However, the electronic computing device may adjust weighting factors associated with the confidence value determination. For example, the electronic computing device may double the point values for each data feed (for example, to four points and ten points, respectively) when the incident type is severe such as a bomb threat or a shooting. As another example, the electronic computing device may change the point values (for example, to three and eight points, respectively) when the location type is a more vulnerable area such as a school.

In some embodiments, settings such as the weighting factors that relate to how the electronic computing device determines the confidence value for incidents are configurable by a user (for example, at the command center 110). For example, a memory of the electronic computing device stores settings and/or rules received from a user via an input device to control settings relating to the above-noted factors. While stored settings and/or rules are described above with respect to the factors used to determine the confidence value for the incident, other factors described below may also include stored user-configurable settings and/or rules. In some embodiments, the electronic computing device applies different weighting factors to different data feeds based on historical information to refine the calculation of the confidence value. For example, when data feeds from the network-connectable device 105 of a citizen have been consistently reliable in the past, the electronic computing device may increase the amount that the confidence value is affected by a data feed received from said network-connectable device 105 to be higher than that of other data feeds received from network-connectable devices 105 of other citizens. As another example, the electronic computing device may compare patterns of received data feeds of a current incident to patterns of received data feeds to previous similar incidents (for example, incident of the same type) to refine how the electronic computing device calculates the confidence value. For example, when the pattern of received data feeds is similar to that of previous similar incidents, the electronic computing device may increase the weighting factors to increase the confidence value for the incident more quickly.

In some embodiments, the electronic computing device is configured to extract one or more keywords included in each data feed of the one or more data feeds as explained above. In some embodiments, the electronic computing device is configured to determine a number of occurrences of related keywords within a geofence around a location from which at least one of the data feeds was received. In other words, the electronic computing device may be configured to generate a heat map of occurrences of related keywords within a geographical area. For example, the electronic computing device determines an estimated location of an incident based on the locations and the number of occurrences of related keywords in received data feeds. The electronic computing device may also establish a radius of a geofence based on, for example, a location of a network-connectable device 105 that has provided a data feed relating to the incident but is located farthest away from the estimated location of the incident with respect to the other network-connectable devices 105 that have provided data feeds relating to the incident. In some embodiments, the electronic computing device determines the confidence value of the incident based on a determined number of occurrences of related keywords within the geofence. For example, for each occurrence of related keywords within the geofence within a predetermined time period, the electronic computing device may increase the confidence value by three points. In some embodiments, the number of occurrences of related keywords within the geofence includes a total amount of occurrences of related extracted keywords from the data feeds within the geofence (for example, multiple occurrences in the same data feed may count separately). In other embodiments, the total number of occurrences of related keywords within the geofence includes the number of data feeds within the geofence that have related extracted keywords (for example, each data feed with related keywords may only be counted once even though multiple instances of the related keywords are included in a single data feed).

In some embodiments, related keywords include keywords that are identical, that are synonyms with each other, or that are otherwise related. For example, the keywords "fire," "flames," "smoke," "burn," and the like may be considered related keywords associated with an incident that is a fire. In some embodiments, related keywords are stored in the memory of the electronic computing device and may be adjusted by a user similar to other user-adjustable settings as explained above.

At block 520, the electronic computing device determines whether the confidence value for the incident is above a predetermined threshold. In some embodiments, the electronic computing device determines the predetermined threshold based on one or more of the incident type of the incident and the location type of the incident. For example, the electronic computing device may set a lower predetermined threshold for a bomb threat at a school than for a gas leak in a residential home. In this example, the lower predetermined threshold allows the electronic computing device to determine to transmit a reverse emergency message at a lower confidence value (in other words, more quickly) for a potentially more severe incident. In other words, in some embodiments, the electronic computing device determines the predetermined threshold based on the severity level of the incident.

In other embodiments, the electronic computing device may maintain the same predetermined threshold for different incidents but may adjust the confidence value of different incidents differently depending on one or more of the incident type of the incident and the location type of the incident (as explained above with respect to the weighting factors). Continuing the above example, when receiving a similarly-reliable data feed from a network-connectable device 105 of an officer for two different incidents, the electronic computing device may increase the confidence value more for the bomb threat at the school than for the gas leak at the residential home. In this example, by adjusting the confidence value of the incident, the electronic computing device achieves the same goal as adjusting the predetermined threshold to allow the electronic computing device to transmit a reverse emergency message more quickly for a more severe incident. As explained above, these settings may be configurable by a user, for example, via an input device. In other words, the electronic computing device is configured to adjust at least one of the predetermined threshold and the weighting factors used to determine the confidence value based on configurable settings received via an input device.

When the electronic computing device determines that the confidence value is not above the predetermined threshold (at block 520), the electronic computing device stores at least one of the content included in each data feed, a location from which each data feed was received, and a time associated with each data feed. In some embodiments, the electronic computing device uses such stored information in its additive determination of the confidence value of the incident when additional data feeds are received that relate to the incident. For example, when the electronic computing device determines that the confidence value is not above the predetermined threshold (at block 520), the method 500 proceeds back to block 505 to repeat blocks 505 through 520 to continue receiving data feeds and determining an updated confidence value for the incident based on the received data feeds.

When the electronic computing device determines that the confidence value is above the predetermined threshold (at block 520), at block 525, the electronic computing device transmits, via a network interface, a message including information about the incident to a second network-connectable device 105 in response to determining that the confidence value of the incident is above the predetermined threshold. In other words, at block 525, the electronic computing device transmits a reverse emergency message to one or more network-connectable devices 105. In some embodiments, the reverse emergency message provides information to the network-connectable devices 105 located near the incident (in other words, located within a geographic area impacted by the incident) to instruct users of the network-connectable devices 105 to take a recommended action. For example, the reverse emergency message may include information regarding a tornado warning and a recommendation that the users of the network-connectable devices 105 receiving the reverse emergency message seek immediate shelter. In other embodiments, the electronic computing device transmits a reverse emergency message to one or more network-connectable devices 105 that have subscribed to receive the reverse emergency message. For example, the network-connectable devices 105 subscribe to receive reverse emergency messages relating to one or more specific types of incident (for example, missing child alerts, active shooter alerts, and the like) and/or relating to one or more specific geographical areas (for example, messages relating to a location of user's home, place of employment, vacation home, home of family member, and the like). In some embodiments, the electronic computing device selects recipients of the reverse emergency message in additional manners. In some embodiments, after the electronic computing device executes block 525, the method 500 proceeds back to block 505 to repeat block 505 through 525, for example, to update the reverse emergency message when circumstances of the incident change.

In some embodiments, to transmit the reverse emergency message to one or more network-connectable devices 105 located near the incident, the electronic computing device is configured to establish a geofence based on the location from which one or more of the data feeds was received. For example, the electronic computing device estimates a location of the incident based on the location from which one or more of the data feeds was received. The electronic computing device may also establish a radius from the estimated location of the incident based on the farthest away network-connectable device 105 that provided a data feed relating to the incident as explained above. In some embodiments, the electronic computing device determines that the second network-connectable device 105 is located within the geofence. In some embodiments, the electronic computing device transmits the reverse emergency message to the second network-connectable device 105 based on determining that the second network-connectable device 105 is located within the geofence. In other words, the electronic computing device is configured to transmit the reverse emergency message to network-connectable devices 105 within a predetermined area near the incident to avoid transmitting the reverse emergency message to recipients that are unlikely to be affected by the incident. In some embodiments, the electronic computing device is configured to establish the geofence in other manners and may establish different sized geofences depending on at least one or more of incident type, location type, or another factor. Like the other settings described above, such geofence settings may be user configurable.

In some embodiments, the electronic computing device is configured to determine a probability that the incident is occurring based on the confidence value. For example, the score of the confidence value may directly correspond to a probability that the incident is occurring (as one example, a confidence value score of eighty indicates an eighty percent chance that the incident is occurring). In some embodiments, the reverse emergency message includes the probability that the incident is occurring. For example, the reverse emergency message may state that "there is a 90% chance of a gas leak in your area."

In some embodiments, before the confidence value reaches the predetermined threshold described above with respect to block 520, the electronic computing device provides a notification to a communication device 210 of a dispatcher to prompt the dispatcher to consider manually initiating a reverse emergency message. For example, the predetermined threshold described above with respect to block 520 is a first threshold that is higher than a second threshold. As but one example, the first threshold is a confidence value score of at least ninety points while the second threshold is a confidence value score of at least fifty points. In some embodiments, the electronic computing device is configured to determine the confidence value of the incident as described above (with respect to block 515) and determine that the confidence value is above the second threshold and below the first threshold (continuing the above example, between fifty and ninety points). In such situations, the electronic computing device may provide a notification on a communication device 210 of a dispatcher in response to determining that the confidence value is above the second threshold and below the first threshold. In response to providing the notification on the communication device 210, the electronic computing device may receive an input from the communication device 210. For example, the input may be received via an input device of the communication device 210 from a dispatcher who desires to manually initiate transmission of a reverse emergency message. In response to receiving the input from the communication device 210, the electronic computing device transmits a message including the information about the incident to the second network-connectable device 105. In other words, the electronic computing device transmits a reverse emergency message to one or more network-connectable devices 105 located at or near the incident as explained above. After determining that the confidence value is above the second threshold and providing the notification on the communication device 210, the electronic computing device may continue to repeatedly execute the method 500 to continue to receive data feeds relating to the incident and continue to update the confidence value of the incident based on the received data feeds until the confidence value meets or exceeds the first threshold.

In some situations, the electronic computing device determines that the confidence value of a incident is below both the first threshold and the second threshold. In such situations, the electronic computing device may not transmit a reverse emergency message or provide a notification to a communication device 210 of a dispatcher to prompt the dispatcher to consider manually initiating transmission of a reverse emergency message. Rather, the electronic computing device may continue to receive data feeds relating to the incident and continue to update the confidence value of the incident based on the received data feeds until the confidence value meets or exceeds at least one of the first threshold and the second threshold as indicated by FIG. 5. In response thereto, the electronic computing device takes the corresponding action as described above. In other words, the electronic computing device may repeat blocks 505, 510, and 515 of the method 500 until the electronic computing device determines that the confidence value of the incident has increased above the first threshold or the second threshold. In some embodiments, the electronic computing device may continue to repeat blocks 505, 510, and 515 of the method 500 even after the confidence value of the incident has surpassed the first threshold or the second threshold.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
a network interface configured to receive one or more data feeds from one or more first network-connectable devices;
an electronic processor configured to
determine that each data feed of the one or more data feeds is related to an incident based on content included in each data feed, a location from which each data feed was received, and a time associated with each data feed,
determine a confidence value for the incident based on an incident type of the incident, a location type of the incident, and at least a portion of the data feeds,
determine that the confidence value is above a first predetermined threshold that is higher than a second threshold,
transmit, via the network interface, a message including information about the incident to a second network-connectable device in response to determining that the confidence value of the incident is above the first predetermined threshold;
determine that the confidence value is above the second threshold and below the first predetermined threshold,
provide a notification on a communication device in response to determining that the confidence value is above the second threshold and below the first predetermined threshold,
receive an input from the communication device in response to providing the notification on the communication device, and
transmit, via the network interface, the message including the information about the incident to the second network-connectable device in response to receiving the input from the communication device.

2. The electronic computing device of claim 1, wherein each of the one or more data feeds includes at least one of the group consisting of a video feed, an audio feed, an image feed, a text feed, and a sensor input data feed.

3. The electronic computing device of claim 1, wherein the electronic processor is configured to:
extract one or more keywords included in each of the data feeds; and
determine a number of occurrences of related keywords within a geofence around a location from which at least one of the data feeds was received.

4. The electronic computing device of claim 1, wherein the electronic processor is configured to store the content included in each data feed, the location from which each data feed was received, and the time associated with each data feed.

5. The electronic computing device of claim 1, wherein the electronic processor is configured to determine the at least one of the first predetermined threshold and the second threshold based on one or more of the incident type of the incident and the location type of the incident.

6. The electronic computing device of claim 1, wherein the electronic processor is configured to adjust at least one of the first predetermined threshold, the second threshold, and weighting factors used to determine the confidence value based on configurable settings received via an input device.

7. The electronic computing device of claim 1, wherein the electronic processor is configured to:
establish a geofence based on the location from which one or more of the data feed was received;
determine that the second network-connectable device is located within the geofence; and
transmit via the network interface, the message including the information about the incident to the second network-connectable device based on determining that the second network-connectable device is located within the geofence.

8. The electronic computing device of claim 1, wherein the electronic processor is configured to determine a probability that the incident is occurring based on the confidence value, wherein the message including the information about the incident includes the probability that the incident is occurring.

9. A method of managing emergency messaging, the method comprising:
receiving, via a network interface of an electronic computing device, one or more data feeds from one or more first network-connectable devices;
determining, with an electronic processor of the electronic computing device, that each data feed of the one or more data feeds is related to an incident based on content included in each data feed, a location from which each data feed was received, and a time associated with each data feed;
determining, with the electronic processor, a confidence value for the incident based on an incident type of the incident, a location type of the incident, and at least a portion of the data feeds;
determining, with the electronic processor, that the confidence value is above a first predetermined threshold that is higher than a second threshold;
transmitting, via the network interface, a message including information about the incident to a second network-connectable device in response to determining that the confidence value of the incident is above the first predetermined threshold;
determining, with the electronic processor, that the confidence value is above the second threshold and below the first predetermined threshold;
providing a notification on a communication device in response to determining that the confidence value is above the second threshold and below the first predetermined threshold;
receiving an input from the communication device in response to providing the notification on the communication device; and
transmitting, via the network interface, the message including the information about the incident to the second network-connectable device in response to receiving the input from the communication device.

10. The method of claim 9, wherein receiving the one or more data feeds includes receiving one or more of a video feed, an audio feed, an image feed, a text feed, and a sensor input data feed.

11. The method of claim 9, further comprising:
extracting, with the electronic processor, one or more keywords included in each of the data feeds; and
determining, with the electronic processor, a number of occurrences of related keywords within a geofence around a location from which at least one of the data feeds was received.

12. The method of claim 9, further comprising storing, with the electronic processor, the content included in each data feed, the location from which each data feed was received, and the time associated with each data feed.

13. The method of claim 9, further comprising determining, with the electronic processor, at least one of the first predetermined threshold and the second threshold based on one or more of the incident type of the incident and the location type of the incident.

14. The method of claim 9, further comprising adjusting, with the electronic processor, at least one of the first predetermined threshold, the second threshold, and weighting factors used to determine the confidence value based on configurable settings received via an input device.

15. The method of claim 9, further comprising:
establishing, with the electronic processor, a geofence based on the location from which one or more of the data feed was received;
determining, with the electronic processor, that the second network-connectable device is located within the geofence; and
transmitting, via the network interface, the message including the information about the incident to the second network-connectable device based on determining that the second network-connectable device is located within the geofence.

16. The method of claim 9, further comprising determining, with the electronic processor, a probability that the incident is occurring based on the confidence value, wherein transmitting the message including the information about the incident includes transmitting information indicating the probability that the incident is occurring.

* * * * *